US008740697B2

(12) United States Patent
Van Baltz et al.

(10) Patent No.: US 8,740,697 B2
(45) **Date of Patent: *Jun. 3, 2014**

(54) INTERFACE FOR A GAMING MACHINE

(71) Applicant: Aristocrat Technologies, Inc., Las Vegas, NV (US)

(72) Inventors: Frederick Van Baltz, Las Vegas, NC (US); J. Christopher McNamee, Las Vegas, NC (US); Stephanie Maddocks, Las Vegas, NV (US); Michael D'Amico, Las Vegas, NV (US); Lori McDermeit, Las Vegas, NC (US); Alan G. Sheldon, No. Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,299

(22) Filed: Nov. 14, 2013

(65) Prior Publication Data

US 2014/0100021 A1 Apr. 10, 2014

Related U.S. Application Data

(63) Continuation of application No. 13/849,327, filed on Mar. 22, 2013, now Pat. No. 8,608,553, which is a continuation of application No. 11/946,618, filed on Nov. 28, 2007, which is a continuation of application No. 11/073,909, filed on Mar. 7, 2005, now Pat. No. 7,704,143, which is a continuation of application No. 09/960,696, filed on Sep. 21, 2001, now Pat. No. 6,896,619, which is a continuation of application No. 09/693,183, filed on Oct. 19, 2000, now Pat. No. 6,676,515.

(51) Int. Cl.
*G07F 17/32* (2006.01)
*A63F 13/12* (2006.01)

(52) U.S. Cl.
USPC .................... 463/25; 463/42

(58) Field of Classification Search
USPC .................... 463/25
See application file for complete search history.

(56) References Cited

U.S. PATENT DOCUMENTS

| | | | | |
|---|---|---|---|---|
| 6,394,907 | B1 * | 5/2002 | Rowe | 463/42 |
| 6,676,515 | B1 * | 1/2004 | Baltz et al. | 463/25 |
| 6,892,182 | B1 * | 5/2005 | Rowe et al. | 705/14.12 |
| 6,896,619 | B2 * | 5/2005 | Baltz et al. | 463/25 |
| 7,454,363 | B1 * | 11/2008 | Rowe | 705/14.12 |
| 7,704,143 | B2 * | 4/2010 | Baltz et al. | 463/25 |
| 8,608,553 | B2 * | 12/2013 | Baltz et al. | 463/25 |
| 2008/0139302 | A1 * | 6/2008 | Baltz et al. | 463/25 |

* cited by examiner

*Primary Examiner* — Dmitry Suhol
*Assistant Examiner* — Jay Trent Liddle
(74) *Attorney, Agent, or Firm* — McAndrews, Held & Malloy, Ltd.

(57) ABSTRACT

A gaming machine adapted to print validated tickets for a game player includes a microprocessor for controlling game operation (e.g., slot machine operation) and including a cash-out signal input, a network interface coupled to the microprocessor for communicating with a central authority, and a memory in the network interface that stores a pre-loaded ticket validation number received from the central authority. In addition, a ticket printer is coupled to the microprocessor for printing a ticket that includes pending credit indicia and pre-loaded ticket validation indicia in response to a cashout signal on the cashout signal input. After the ticket is printed, the gaming machine obtains a new pre-loaded validation number in preparation for the next ticket printing event.

9 Claims, 6 Drawing Sheets

INTERFACE FOR A GAMING MACHINE

RELATED APPLICATIONS

This application is a continuation of U.S. application Ser. No. 13/849,327 entitled INTERFACE FOR A GAMING MACHINE filed Mar. 22, 2013, which is a continuation of U.S. application Ser. No. 11/946,618 entitled INTERFACE FOR A GAMING MACHINE filed Nov. 28, 2007, which is a continuation of U.S. application Ser. No. 11/073,909 entitled APPARATUS AND METHOD FOR A CASHLESS ACTUATED GAMING SYSTEM filed Mar. 7, 2005, now U.S. Pat. No. 7,704,143, which is a continuation of U.S. application Ser. No. 09/960,696 entitled APPARATUS AND METHOD FOR A CASHLESS ACTUATED GAMING SYSTEM filed Sep. 21, 2001, now U.S. Pat. No. 6,896,619, which is a continuation of U.S. application Ser. No. 09/693,183 entitled APPARATUS AND METHOD FOR A SECURE TICKET ACTUATED GAMING SYSTEM filed Oct. 19, 2000, now U.S. Pat. No. 6,676,515. The foregoing applications are herein incorporated by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates generally to a ticketing gaming system and, more particularly, to a gaming system that encompasses printing and validation of tickets with ticket validation numbers pre-loaded by a central computer system to individual gaming machines.

Gaming machines, particularly slot machines, have in recent years become one of the more popular, exciting, and sophisticated wagering activities available at casinos and other gambling locations. At the same time, slot machines have also become a source of greater revenue for gaming establishments.

Typically, a player, when finished playing, "cashes out" at the slot machine by activating a cashout button. At that time, the slot machine converts the amount of credits pending in the slot machine to a currency payout that is dispensed (e.g., as coins) to the player. The player must then collect all of the coins, fill a cup or pockets, then move to the next slot machine and reenter all of the coins. Thus, the prior payout techniques tended to interrupt gameplay, thereby reducing profits and also reducing the excitement and entertainment experience that arise from uninterrupted game play.

In the past, slot machines have attempted to address the interruption caused when a player collects coins and moves to another slot machine. In particular, some slot machines have issued paper tickets that encode the amount of credit pending in the slot machine when the player presses the cashout button. The player may then simply pick up the ticket dispensed by the slot machine and proceed to a new slot machine without incurring the time delay and distraction associated with collecting currency and reinserting it into the new slot machine.

Successful ticketing, however, requires a comprehensive system level approach to ensure that the tickets are secure (e.g., they cannot be duplicated and reused, they cannot be forged, and the like), that as many slot machines as possible can accept tickets, and that ticketing does not cause as much interruption as the coin/currency payout that the tickets are designed to replace. However, in prior ticketing systems for example, the slot machines typically had to spend the time and processing resources to generate their own ticket validation numbers, or had to incur the delay of requesting a ticket validation number from a central authority each time the slot machine needed to print a ticket. As a result, prior slot machines exposed the player to unnecessary processing delay, thereby slowing play, and reducing the overall level of player enjoyment.

A need has long existed in the industry for a secure ticket actuated gaming system that addresses the problems noted above and other previously experienced.

BRIEF SUMMARY OF THE INVENTION

A preferred embodiment of the invention provides a method for issuing validated tickets to a gaming machine player. The method includes pre-loading a ticket validation number from a central authority to a network interface board connected to a gaming machine, tracking pending credit in the gaming machine, and monitoring at the gaming machine for a cashout signal. In response to the cashout signal, the method proceeds by printing a ticket including pending credit indicia and pre-loaded ticket validation indicia obtained from the interface board. In general, when a ticket validation number is pre-loaded onto the network interface board, the ticket validation number is also pre-stored in a ticketing database (albeit without an associated pending credit amount). Thus, should the gaming network fail, validation may still occur through human intervention.

After the pre-loaded validation number is used, the method pre-loads a subsequent ticket validation number from the central authority into the network interface board in the gaming machine in preparation for printing a subsequent ticket. Thus, the gaming machine does not wait for validation numbers when a ticket is to be printed. Rather, the validation number is pre-loaded in the network interface board and is therefore immediately available. The pending credit indicia and the pre-loaded ticket validation number indicia may be a bar code, Arabic (or other human intelligible indicia), and the like.

Another preferred embodiment of the invention provides a gaming machine adapted to print validated tickets for a game player. The gaming machine includes a microprocessor for controlling game operation (e.g., slot machine operation), a cashout signal input, a network interface coupled to the microprocessor for communicating with a central authority, and a memory in the network interface that stores a pre-loaded ticket validation number received from the central authority. In addition, a ticket printer is coupled to the microprocessor for printing a ticket that includes pending credit indicia and pre-loaded ticket validation indicia in response to a cashout signal on the cashout signal input. After the ticket is printed, the gaming machine preferably sends record keeping information back to the central authority. In particular, the record keeping information may include a pending credit identifier and ticket identifier.

In another preferred embodiment, a gaming network includes a central authority, a central authority network interface coupled to the central authority and a network medium, and one or more gaming machines. Each gaming machine generally includes a game controller for controlling game operation and a cashout signal input and a game machine network interface coupled to the network medium and to the game controller. In addition, a ticket printer directly couples to the network interface for printing a ticket in response to the cashout signal and a ticket reader directly couples to the network interface for reading tickets. As a result, the central authority may exercise control over the ticket printer and ticket reader (and, optionally, a bill/coin validator) through the game machine network interface.

DETAILED DESCRIPTION OF THE INVENTION

Figure 1:
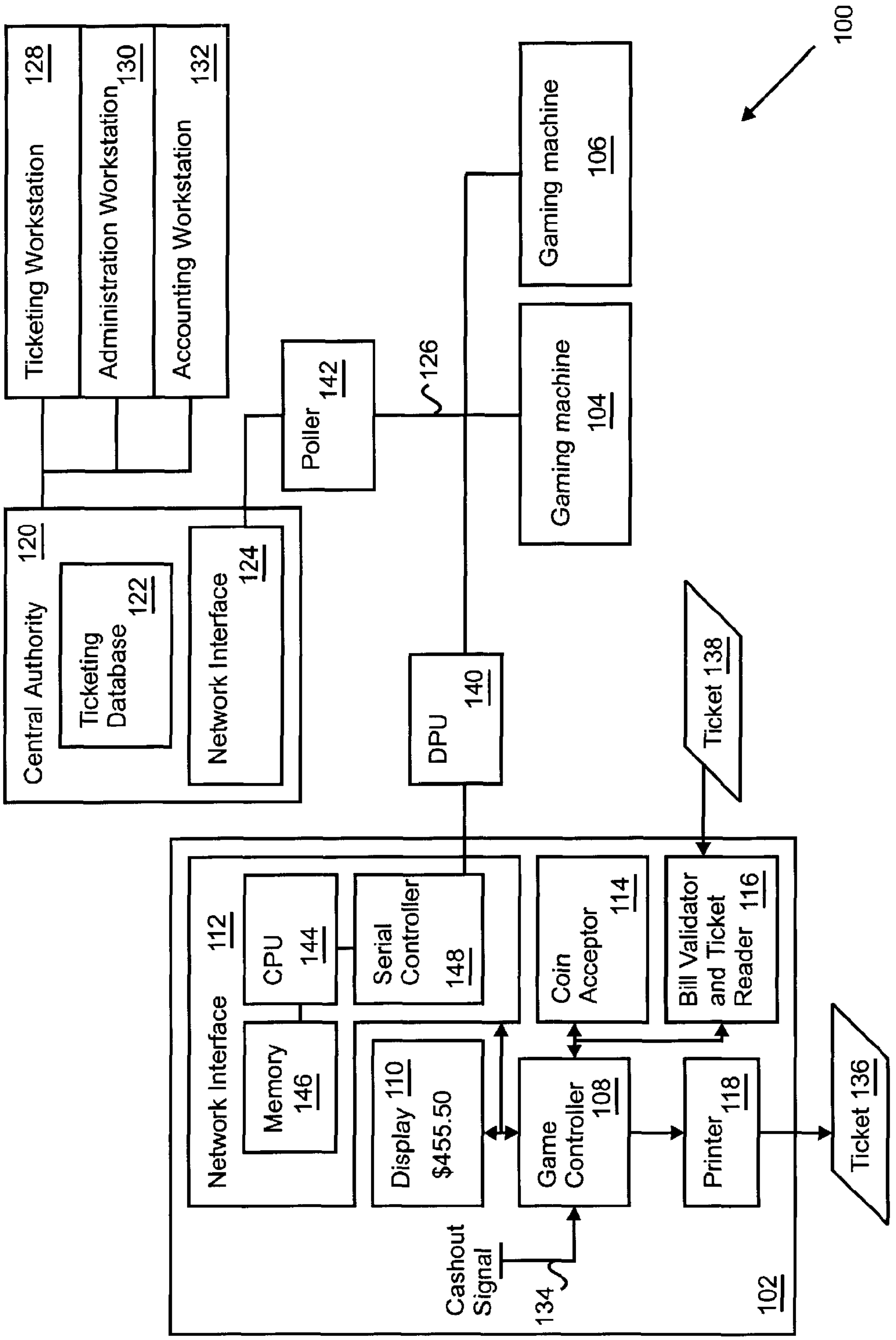
FIG. 1 illustrates a block diagram of a gaming network.

Referring to FIG. 1, a gaming network 100 includes several gaming machines 102, 104, 106. The gaming machines 102-106 may be implemented, for example, as slot machines, video poker machines, video roulette machines, and the like. Each gaming machine 102-106 includes a game controller 108, a display 110, and a network interface 112. The network interface 112 may be, for example, an RS485 interface such as that implemented by a Sentinel™ Interface from Casino Data Systems. Other interfaces and network architectures (e.g., Ethernet, parallel port, and the like) may be substituted however. Furthermore, the network interface 112 may adhere to, for example, the IGT Gaming SAS™ communication protocol, the CDS GDAP™ communication protocol, a custom protocol, or another third party communication protocol for establishing and maintaining communication with the gaming machine 102. The network interface 112 may be physically present inside the gaming machine 102, or may be located externally and coupled to the gaming machine 102. Each gaming machine 102-106 further includes a coin acceptor 114, a bill validator/ticket reader 116, and a ticket printer 118.

As will be explained in more detail below, the game controller 108 is responsive to the cashout signal 134 to print a ticket 136 on paper, or other suitable material. Additionally, previously printed tickets (e.g., the ticket 138) may be redeemed by the gaming machines 102-106. The gaming network also includes a central authority or host computer system 120. The central authority 120 includes a ticketing database 122 and a network interface 124 for connection over the network medium 126 to the gaming machines 102-106. Support systems connect to the central authority 120, including a ticketing workstation 128, an administration workstation 130, and an accounting workstation 132.

A dataport unit (DPU) 140 is provided as a data concentrator and buffering communication unit to address multiple gaming machines and to communicate with the poller 142. The poller 142, in turn, communicates with the DPU 140 and the central authority 120. The network interface 112 may be generally configured as shown in FIG. 1 to include a CPU 144, a program and data memory 146, and a serial controller 148.

The game controller 108 is responsible for operation of the gaming device 102. Thus the game controller 108 may include a microprocessor, memory, game software, and support circuitry to implement a slot machine or other type of game. The display 110 presents to the player a representation of the pending credit in the gaming machine 102 (e.g., $455.50 as shown in FIG. 1). During play, the game controller 108 tracks the pending credit according to the rules of the game and the interaction with the player (including the deposit of additional funds via the coin acceptor 114 and bill validator 116), and further monitors for assertion of the cashout signal 134. Thus, the central authority 120 need not monitor the pending credit in each gaming machine 102-106, as each gaming machine 102-106 preferably tracks the pending credit locally and independently of the central authority 120.

In response to the cashout signal 134, the game controller 108 prints the ticket 136 which may be redeemed later at other gaming machines 102-106 or at independent workstations with ticket readers. The cashout signal 134 may be generated by a player actuated switch, touchscreen input, or the like. As will be explained in more detail below, the game controller 108 prints the ticket 136 with a pre-loaded ticket validation number obtained from the central authority 120 through the network interfaces 112, 124 and over the network medium 126. The central authority 120 uses an encryption algorithm to generate validation numbers. Preferably, the algorithm is based at least on time and/or date as well as a gaming machine number.

The ticketing database 122, described in more detail with reference to Tables 1-3 below, stores information obtained from the gaming machines 102-106, as well as locally generated validation numbers. The ticketing workstation 128 provides cash redemption of tickets outside of gaming machines, the administration workstation 130 provides an interface for setting up system parameters, and the accounting workstation 132 provides for ticket and gaming machine accounting functions. Note that in general, when a ticket validation number is pre-loaded onto the network interface board, the ticket validation number is also pre-stored in a ticketing database (albeit without an associated pending credit amount). Thus, should the gaming network fail, validation may still occur through human intervention.

Figure 2:
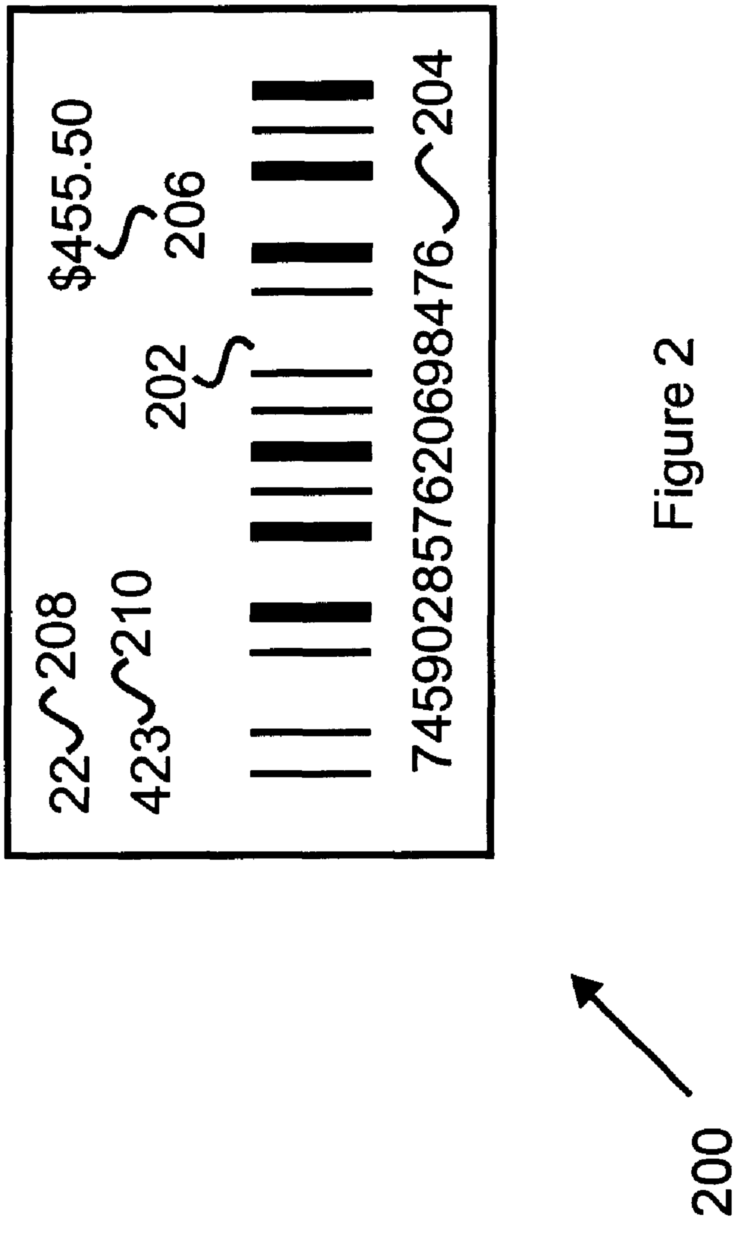
FIG. 2 shows a front view of a ticket used with the gaming network.

Turning next to FIG. 2, a ticket 200 includes a validation number bar code 202 (e.g., in JCM or Code 205 format), a human intelligible validation number 204, and a human intelligible pending credit amount 206. The ticket 200, as shown, also includes a machine number 208 and a ticket number 210 (e.g., a sequential ticket number generated in the gaming machine 102). Note that the validation number bar code 202 is a machine readable representation of a pre-loaded validation number (as discussed in more detail below) but that the validation number bar code 202 generally does not encode other information (e.g., the pending credit amount). In other words, the ticket 200, when it is advantageous to do so, may omit a machine readable pending credit amount. Additional information may also be printed on the ticket 200, including a date/time of cashout, casino name, ticket expiration date, and the like.

Figure 3A:
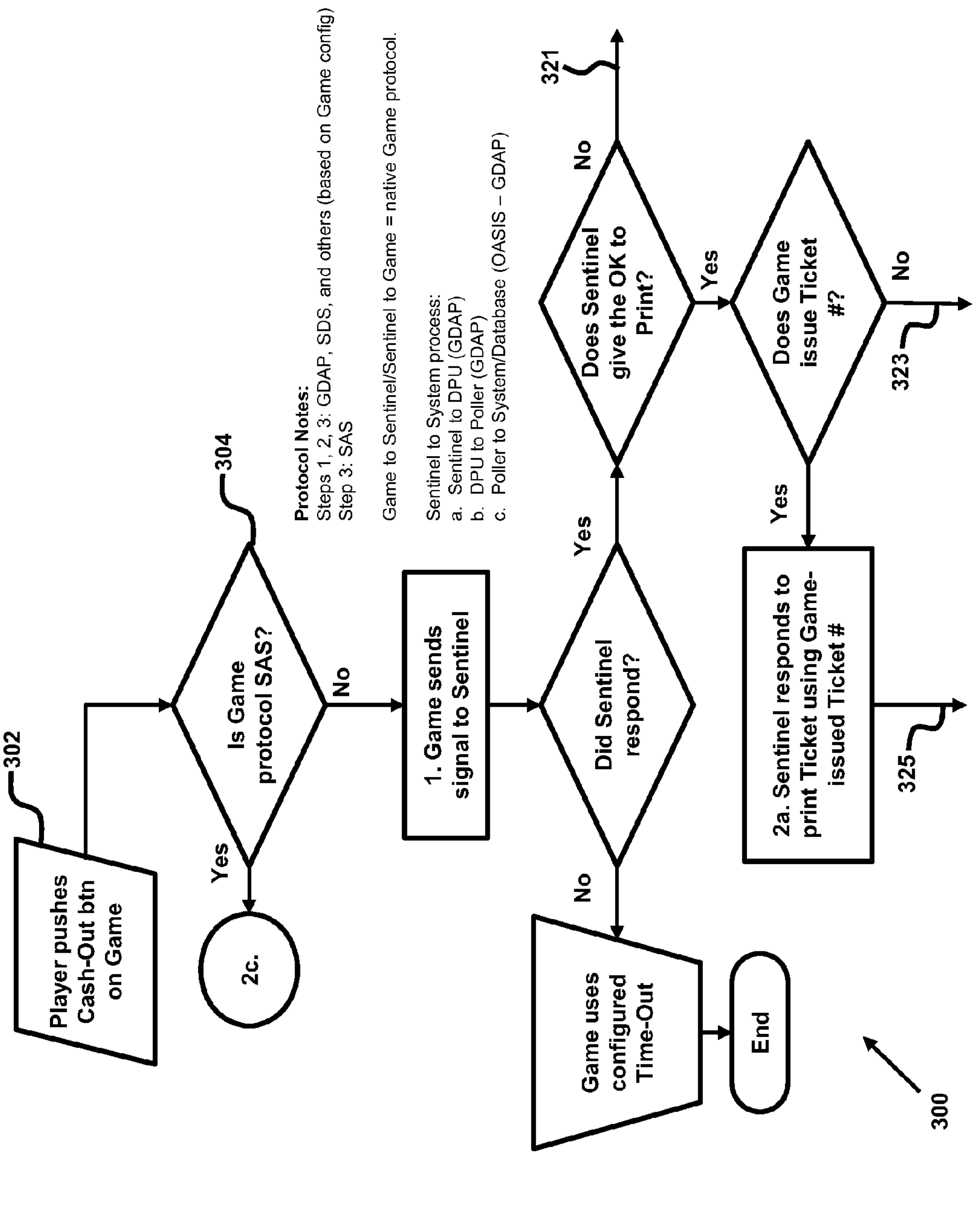
FIGS. 3A and 3B depicts a flow diagram for issuing a validated ticket from a gaming machine in the gaming network.
Figure 3B:
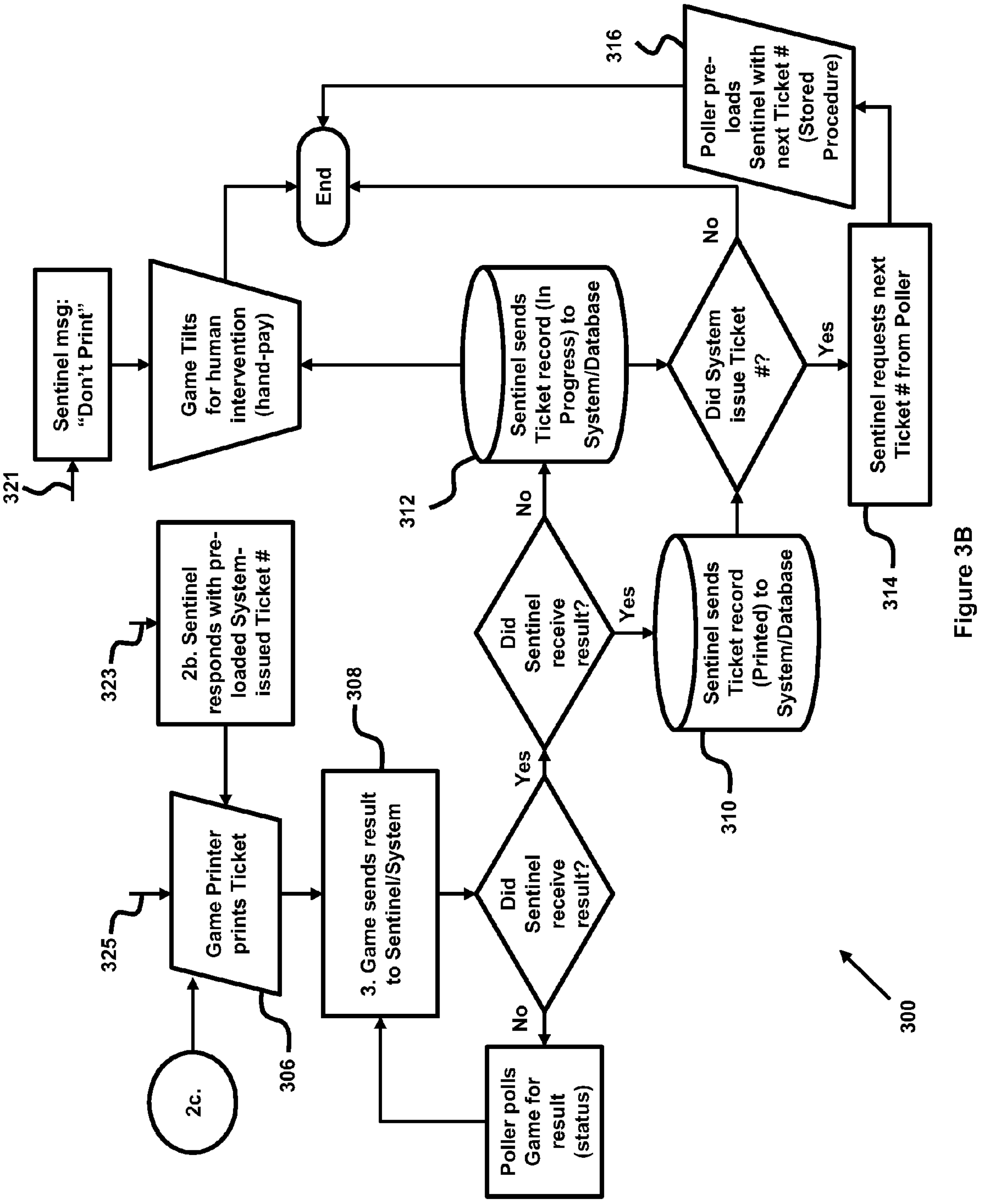

With regard to FIGS. 3A and 3B, a flow diagram 300 shows a ticket printing method that may be implemented in hardware and/or software in the gaming device 102. In FIGS. 3A and 3B, the Sentinel refers to the network interface 112, the poller refers to the poller 142, and the system/database refers to the central authority 120 and its ticketing database 122. The method includes monitoring (302) for a player to press a cashout button and thereby generate the cashout signal 134. Next, the method determines (304) whether a communication protocol (in this case SAS) is running on the gaming system 100 that supports central authority 120 generation of ticket validation numbers. If so, the method proceeds to obtain a pre-loaded validation number from the network interface 112 and print (306) the ticket.

The ticketing database 122 in the central authority may store, for example, the fields set forth below in Table 1 for Ticket Information, Table 2 for Ticket Detail, and Table 3 for Ticket Information.

TABLE 1

| Ticket Info | | |
|---|---|---|
| Field | Definition | Description |
| RecordNum | Int | Auto-incremented system transaction record number. |
| ValidationDigits | TinyInt | # of digits in validation number |
| ValidationNumber | VarChar(32) | Bar Code Number. |
| MachineNumber | Int | Machine number printed on ticket |
| TicketNumber | Int | Game's sequential ticket #, for example 0000 to 9999 |
| AmountType | TinyInt | See below. |
| Amount | Int | |
| Status | TinyInt | See below. |
| StatusDateTime | DateTime | Application time of last Status change. |
| IssuedDateTime | DateTime | Application time table updated. |
| IssuedAppID | SmallInt | Application code: 8 = Poller. |
| IssuedLocation_ID | Int | Workstation, or PollerID If AppID = 8 |
| IssuedID | Int | Machine number if AppID = Poller. |
| PrintedDateTime | DateTime | Date & Time on ticket. |
| PrintedAppID | SmallInt | Application code: 8 = Poller |
| PrintedLocation_ID | Int | Workstation, or PollerID if AppID = 8 |
| PrintedID | Int | SlotMast_ID if AppID = Poller. User_ID if manually entered. |
| PrintedOCR | Char(10) | Player Card Number, if available. |
| RedeemedDateTime | DateTime | Application time table updated. |
| RedeemedAppID | SmallInt | Application code: 8 = Poller. 19 = Ticketing System. |
| RedeemedLocation_ID | Int | Workstation, or PollerID if AppID = 8 |
| RedeemedID | Int | SlotMast_ID if AppID = Poller. User_ID if manually redeemed. |
| RedeemedOverrideID | Int | User_ID of person who authorized override, if required for redeem. |
| RedeemedOCR | Char(10) | Player card number, if available. |
| ExpiredDateTime | DateTime | Application time table updated. |
| ExpiredAppID | SmallInt | Application code: 8 = Poller |
| ExpiredLocation_ID | Int | PollerID if AppID = 18, Workstation if AppID = 19. |
| ExpiredID | Int | User_ID for manual expiration. NULL if expired by Poller. |
| VoidedDateTime | DateTime | Application time table updated. |
| VoidedAppID | SmallInt | Application code: 8 = Poller. |
| VoidedLocation_ID | Int | Workstation, or PollerID if AppID = 8 |
| VoidedID | Int | User_ID for manual void. May be SlotMast_ID or NULL if voided by Poller. |
| DetailCount | Int | Number of detail records for ticket. |

The method continues by sending (308) a ticket printing result (e.g., successful or unsuccessful) to the central authority 120 through the network interface 112. If the ticket is printed successfully, the method sends (310) ticket information for a Printed ticket to the central authority 120 through the network interface 112. The Printed ticket information includes Casino name, ticket date and time, validation number, a bar code representing the validation number, a numeric pending credit amount, an alphanumeric description of the pending amount, a machine number, and a ticket number (typically up to 9999 and sequentially generated at each gaming machine). Otherwise, the method sends (312) an In Progress lock for the ticket to the central authority 120. If the central authority 120 generates ticket validation numbers, then the network interface 112 requests (314) a new ticket validation number from the central authority 120. Subsequently, the network interface 112 receives (316) the new ticket validation number and pre-loads it into a memory (e.g., the memory 146) for use before the next ticket is printed. Thus, a ticket validation number is immediately available when the player activates the cashout button.

TABLE 2

| Ticket Detail | | |
|---|---|---|
| Field | Definition | Description |
| RecordNum | Int | |
| TimeStamp | DateTime | Application time table updated. |
| GameDateTime | DateTime | Time on ticket if ActionCode = Printed. |
| ValidationDigits | TinyInt | # of digits in ValidationNumber. |
| ValidationNumber | VarChar(32) | Bar Code Number |
| MachineNumber | Int | Machine number. |
| AmountType | TinyInt | See below. |
| Amount | Int | |
| ExpirationType | TinyInt | Present if ActionCode = Printed |
| ExpirationDuration | SmallInt | Present if ActionCode = Printed. |
| ActionCode | TinyInt | Game/Sentinel event. See below. |
| ResultCode | TinyInt | Event from System to Sentinel/Game |
| ResultSubCode | Int | Error/warning code by System. |
| StatusIn | TinyInt | Status of ValidationNumber in Ticket Info before processing detail information. See below. |
| StatusOut | TinyInt | Status of ValidationNumber in Ticket Info after processing detail information. |

TABLE 2-continued

| Ticket Detail | | |
|---|---|---|
| Field | Definition | Description |
| | | See below. |
| OCR | Char(10) | Player card number, if available. |
| AppID | SmallInt | Application code: 8 = Poller, Ticketing System = 19 |
| Location_ID | Int | Workstation, or PollerID if AppID = 8 |
| UpdateID | Int | User_ID, SlotMast_ID if AppID = 8 |
| OverrideID | Int | User_ID if required for redemption. |
| TransDate | DateTime | To match with buffer transactions. |
| SiteID | TinyInt | Site of Poller or application |
| PollerID | TinyInt | To match with buffer transactions. |
| DpuID | TinyInt | To match with buffer transactions. |
| SenID | TinyInt | To match with buffer transactions. |
| SlotMast_ID | Int | To match with buffer transactions. |
| IsDamaged | Char | 'N' or 'Y'. Defaults to 'N'. |

TABLE 3

| Ticket Information | | |
|---|---|---|
| Field | Definition | Description |
| Validation Number | VarChar(32) | Bar Code Number |
| TimeStamp | DateTime | Application time row was added. |
| Link0 | SmallInt | Application Code: 8 = poller |
| Link1 | Int | Update ID<br>If link0 = 8 then machine ID with redeem lock.<br>Otherwise, UserID with lock. |
| Link2 | Int | Location ID<br>If link0 = 8 then Poller ID that locked. Otherwise, Workstation with lock. |

Figure 4:
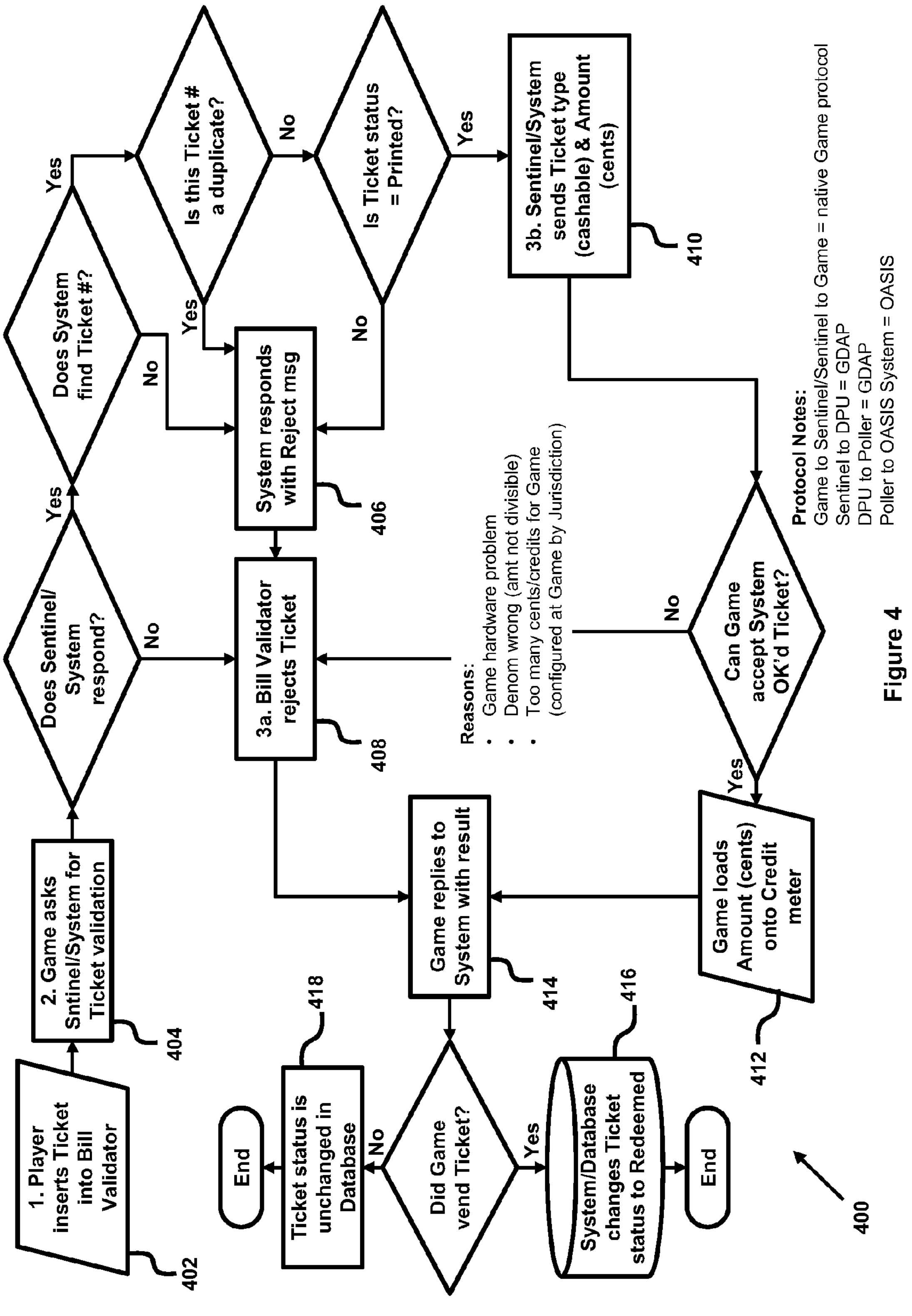
FIG. 4 shows a flow diagram for redeeming a ticket in a gaming network.

Turning next to FIG. 4, a flow diagram 400 shows a ticket redemption method that may be implemented in hardware and/or software in the gaming network 100. In FIG. 4, the Sentinel refers to the network interface 112, the poller refers to the poller 142, and the system/database refers to the central authority 120 and its ticketing database 122. Beginning at step 402, a player inserts a ticket into a gaming machine. The gaming machine proceeds to query (404) the system for ticket validation of the validation number bar code 202. In general, the pending credit printed on the ticket is not read by the ticket reader. Rather, the system itself responds with the pending credit as explained below.

If the system responds (e.g., communication is up), then the system attempts to find the validation number in its database. If not found, the system responds (406) to the gaming machine with a Reject Message. Otherwise, the system checks the ticketing database 122 to determine if the ticket is a duplicate. If so, the system also responds (406) to the gaming machine with a Reject Message. If the validation number is not a duplicate, then the system determines whether the ticket status as recorded in the ticketing database 122 is issued and redeemable (i.e., it has not already been redeemed for money). If not, the system again responds (406) to the gaming machine with a Reject Message. The ticket/bill validator then rejects (408) the ticket.

However, if the ticket was, in fact, successfully printed, the system responds (410) to the gaming machine (and the network interface 112) in particular, with the ticket type and the amount (e.g., in cents). If the gaming machine can accept the ticket (in the absence of a hardware problem, an amount not divisible by a certain unit, an amount too great for the game, and the like), then the game loads (412) the amount into its credit meter. Subsequently, the gaming machine replies (414) to the system with the ticket processing result (e.g., rejected or accepted).

If the gaming machine accepted the ticket and credited its credit meter, then the system changes (416) the ticket status in the ticketing database 122 to Redeemed. As a result, the redeemed ticket is not useable to activate other gaming machines. Rather, additional tickets (or a ticket newly printed upon cashout) would be used to activate additional gaming machines. Continuing with reference to FIG. 4, if the ticket is not accepted, the ticket status remains (418) unchanged in the ticketing database 122.

Figure 5:
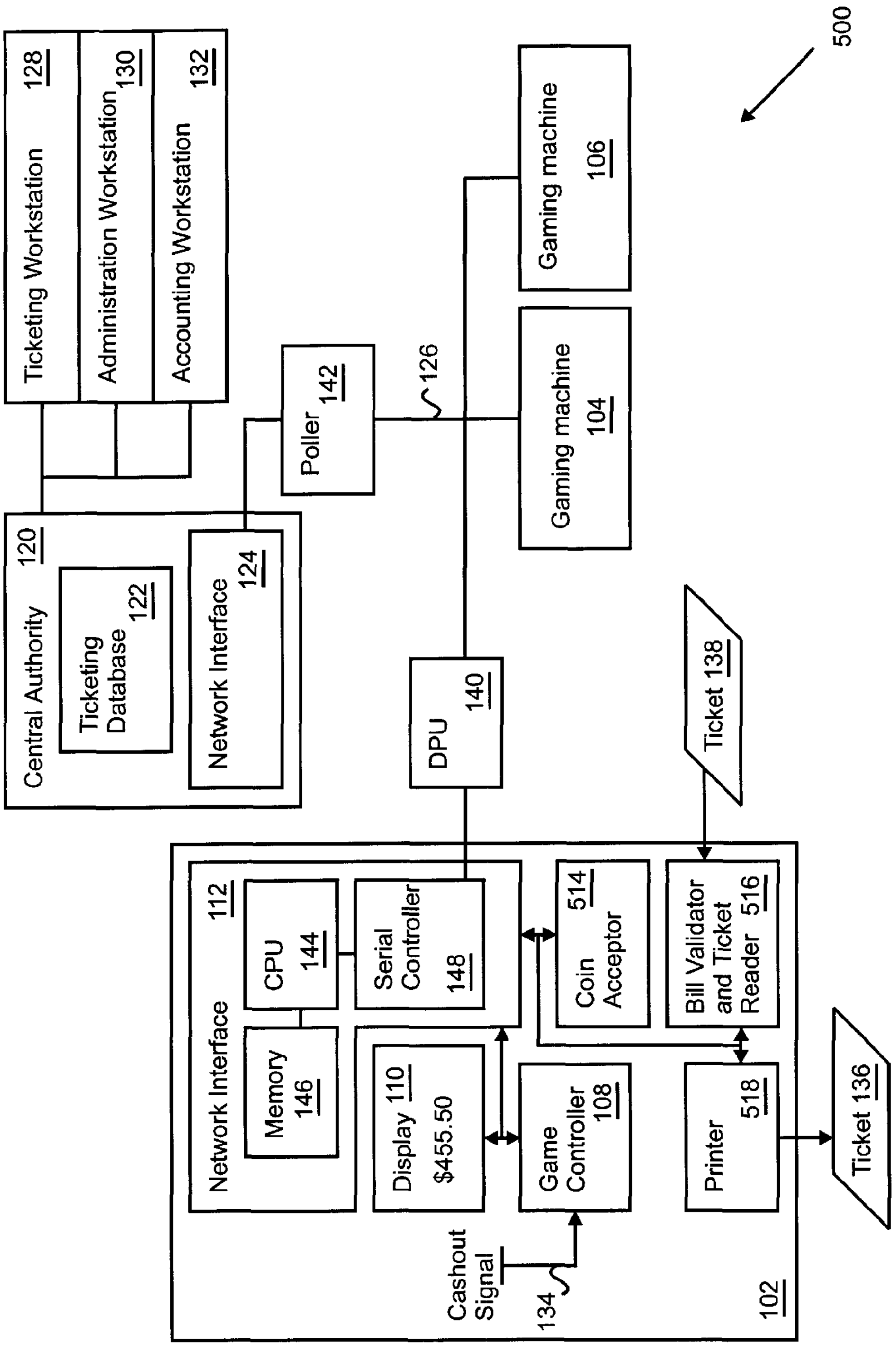
FIG. 5 illustrates a block diagram of a gaming network in which a central authority exercises direct control over a validator, a ticket printer, and a ticket reader.

With reference next to FIG. 5, a block diagram of a gaming network 500 illustrates central authority control over a coin acceptor 514, a bill validator/ticket reader 516, and a ticket printer 518. FIG. 5 is similar to FIG. 1, and like reference numerals denote like parts. Note, however, that the coin acceptor 514, bill validator/ticket reader 516, and ticket printer 518 are connected directly to the network interface 112 rather than to the game controller 108.

As a result, the central authority 120 may exercise control over the coin acceptor 514, bill validator/ticket reader 516, and ticket printer 518 through the network interface 112. The game controller 108 is thereby relieved of those duties. Furthermore, existing gaming machines that do not allow convenient game controller ticket printing, reading, and bill validation may nevertheless issue and redeem tickets when fitted with the network interface 112.

When a ticket is inserted into the ticket reader 516, the network interface 112 reads the ticket directly and proceeds to verify the validation number bar code with the central authority 120 as explained above. Valid tickets result in credit applied to the gaming machine 102 using, for example, an Electronic Funds Transfer (EFT) message from the central authority 120. In addition, the network interface 112 may also read standard currency (e.g., bills and coins) and appropriately report to the central authority 120. Again the central authority may respond with an EFT message to the gaming machine 102. Alternatively, the network interface 112 may determine the amount of standard currency inserted and report that amount directly to the gaming machine 102 (which may then appropriately increment its bill and coin meters). In that regard, the network interface 112 may act as a filter, such that only printed tickets generate appreciable network traffic to the central authority 120.

Thus, the present invention provides a secure ticket actuated gaming network. In particular, the gaming machines pre-load ticket validation numbers in preparation for printing a cashout ticket. As a result, the player need not wait while the gaming machine generates or requests a new validation number.

While the invention has been described with reference to a preferred embodiment, those skilled in the art will understand that various changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. A gaming machine for use with a remote computer system connected to a communication link to allow exchange of messages to and from the computer system, the gaming machine comprising:

a ticket printer actuable for causing the printing of a ticket with a ticket validation code; and an electronic system configured to:

send a request message for the ticket validation code to the remote computer system via the data communication link;

receive the ticket validation code from the computer system via the data communication link;

detect a cashout signal;

in response to detecting the cashout signal, cause the ticket printer to print the ticket that comprises the ticket validation code received from the computer system; and send a print message to the computer system via the data communication link, the print message comprising information about the ticket; and wherein the electronic system is configured to send the request message prior to detecting the cashout signal.

2. The gaming machine as claimed in claim 1, wherein the print message is such that the information about the ticket discloses whether the ticket was successfully printed.

3. The gaming machine as claimed in claim 1, wherein the electronic system comprises a data memory configured to store the ticket validation code prior to the printer printing the ticket.

4. A computer system for use with a remote gaming machine connected to a communication link to allow exchange of messages to and from the gaming machine, said gaming machine configured to print a ticket comprising a ticket validation code upon detecting by said gaming machine a cashout signal, the computer system comprising:

an electronic system configured to:

receive a request message for the ticket validation code from the remote gaming machine via the data communication link;

in response to receiving the request message, send the ticket validation code to the remote gaming machine via the data communication link; and receive a print message from the remote gaming machine via the data communication link, the print message comprises information about the ticket printed by the remote gaming machine; and wherein the electronic system is configured to receive the request message prior to the remote gaming machine detecting the cashout signal.

5. The computer system as claimed in claim 4, wherein the electronic system is configured to determine whether the ticket was successfully printed by the remote gaming machine via the information about the ticket printed by the remote gaming machine.

6. The computer system as claimed in claim 4, wherein the electronic system is configured to generate the ticket validation code based on a cryptographic process.

7. A method for use with a gaming machine, a remote computer system and a communication link to allow exchange of messages between the gaming machine and the remote computer system, the gaming machine comprising a ticket printer to print a ticket upon detecting a cashout signal and an electronic system, the method comprising the steps of:

sending a request message for a ticket validation code from the gaming machine to the remote computer system via the communication link prior to said detecting the cashout signal;

receiving by the gaming machine the ticket validation code from the remote computer system via the data communication link;

detecting a cashout signal;

in response to detecting a cashout signal, causing the ticket printer to print a ticket that comprises the ticket validation code received from the computer system; and in response to the ticket printer printing the ticket, sending a print message from the gaming machine to the remote computer system via the data communication link, the print message comprising information about the ticket.

8. The method as claimed in claim 7, and further including determining whether the ticket was successfully printed via the information about the ticket.

9. The method as claimed in claim 7, and further including storing the ticket validation code prior to said causing the ticket printer to print the ticket.

* * * * *